United States Patent [19]

Cortopassi et al.

[11] 4,147,017

[45] Apr. 3, 1979

[54] TOMATO HARVESTER

[76] Inventors: Dean A. Cortopassi, 11292 N. Alpine Rd., Stockton, Calif. 95205; Alvin G. Cortopassi, 14993 E. Highway 26, Linden, Calif. 95236

[21] Appl. No.: 765,206

[22] Filed: Feb. 3, 1977

[51] Int. Cl.$^2$ ............................................. A01D 45/00
[52] U.S. Cl. ................................ 56/16.5; 56/327 R; 171/14
[58] Field of Search ............... 56/327 R, 14.9, 16.5, 56/218, 228, DIG. 22, DIG. 15; 171/14, 27

[56] References Cited

U.S. PATENT DOCUMENTS

| | | | |
|---|---|---|---|
| 2,559,965 | 7/1951 | Innes | 171/27 |
| 3,078,926 | 2/1963 | Ries et al. | 56/327 R |
| 3,193,020 | 7/1965 | Button | 56/327 R |
| 3,286,774 | 11/1966 | Lorenzen et al. | 56/327 |
| 3,390,768 | 7/1968 | Button | 56/327 R |
| 3,420,239 | 1/1969 | Lorenzen | 130/30 |
| 3,546,860 | 12/1970 | Pool et al. | 56/DIG. 15 |
| 3,579,968 | 5/1971 | Hill et al. | 56/327 |
| 3,609,947 | 10/1971 | Herbsthofer | 56/DIG. 15 |
| 3,618,617 | 11/1971 | Gates et al. | 171/27 |
| 3,628,609 | 12/1971 | Graybill | 171/27 |
| 3,659,618 | 5/1972 | Kobold et al. | 56/DIG. 15 |
| 3,690,383 | 9/1972 | Malley et al. | 56/327 R |
| 3,721,301 | 3/1973 | Weasiel, Jr. et al. | 56/DIG. 15 |
| 3,893,283 | 7/1975 | Dandl | 56/228 |
| 3,986,561 | 10/1976 | Bettencourt et al. | 56/327 R |
| 4,033,099 | 7/1977 | Friedel, Jr. | 56/327 R |

*Primary Examiner*—Louis G. Mancene
*Assistant Examiner*—Paul J. Hirsch
*Attorney, Agent, or Firm*—Naylor, Neal & Uilkema

[57] ABSTRACT

A tomato harvester supported on a draft propelled chassis and having a pair of header conveyors to simultaneously harvest two adjacent crop rows. The chassis is supported on wheels so spaced relative to one another that they may travel between the crop rows and an adjustable draft tongue enables a draft vehicle for the harvester to be positioned in aligned spanning relationship to a crop row ahead of the harvester. During harvesting, the crop, including the vines therefor, is lifted by the harvester and conveyed longitudinally over its length. A shaker conveyor having means to continuously vary the ratio of conveyor speed to oscillation rate subjects harvested vines to shaking to break attached tomatoes away from the vines. A separator is provided to separate loose tomatoes and dirt clods from the vines in advance of the shaker conveyor. Collecting conveyors collect loose tomatoes and dirt clods and preliminarily separate dirt clods from the tomatoes. Final sorting is provided by singulating the tomatoes and subjecting them to electronic sorting.

3 Claims, 12 Drawing Figures

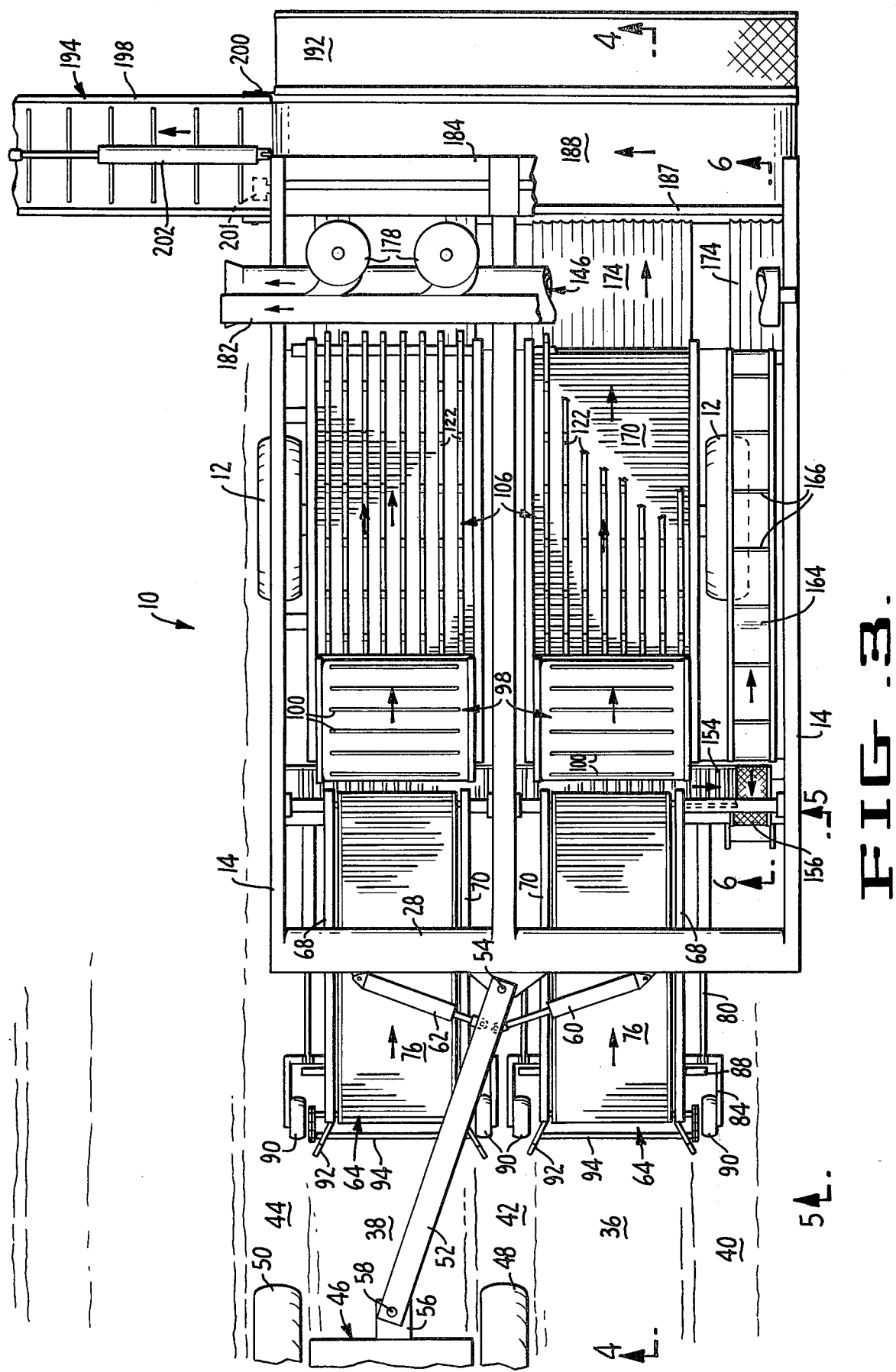

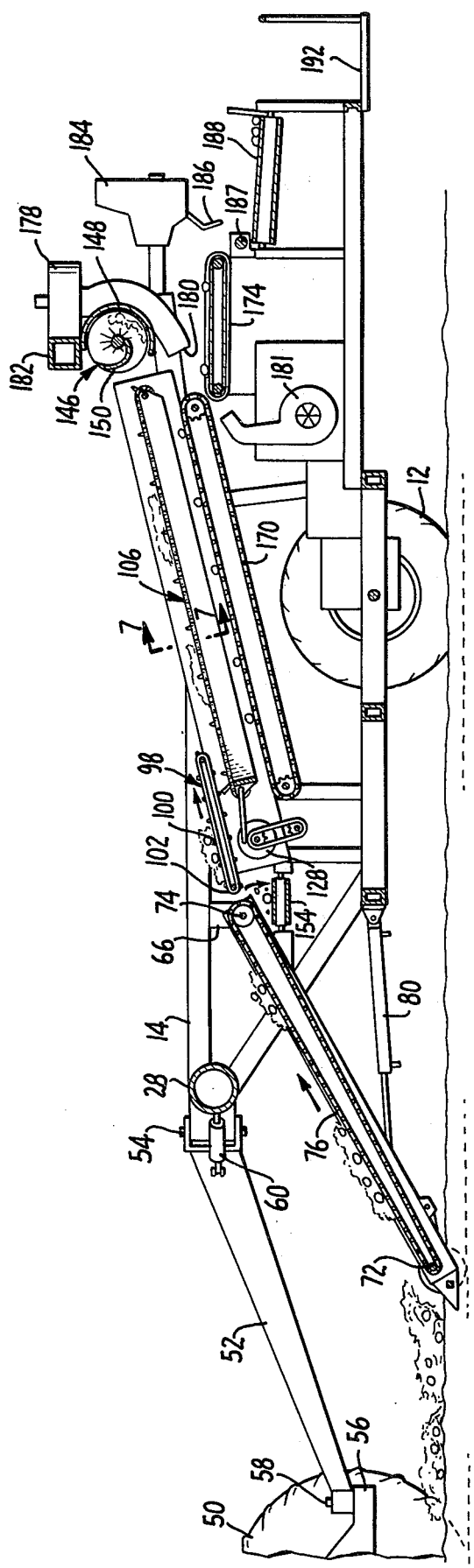
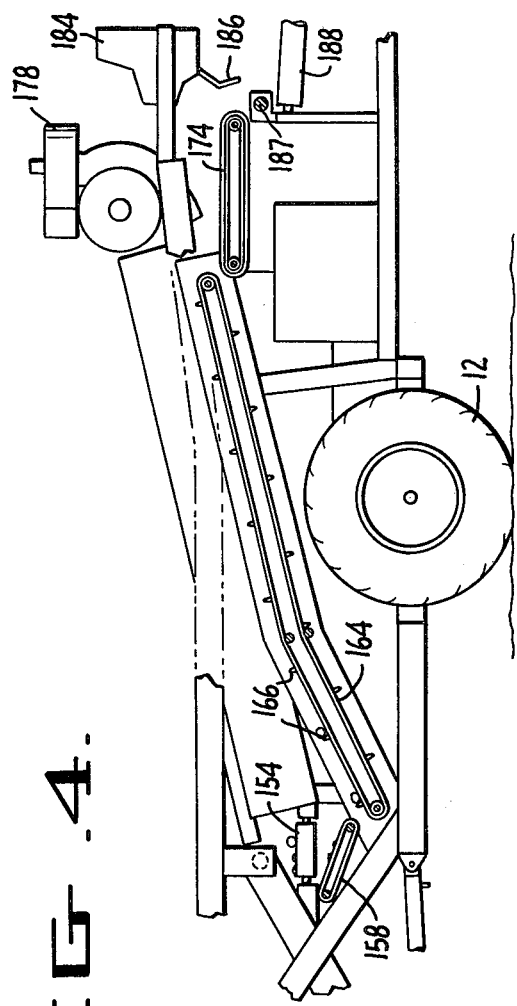

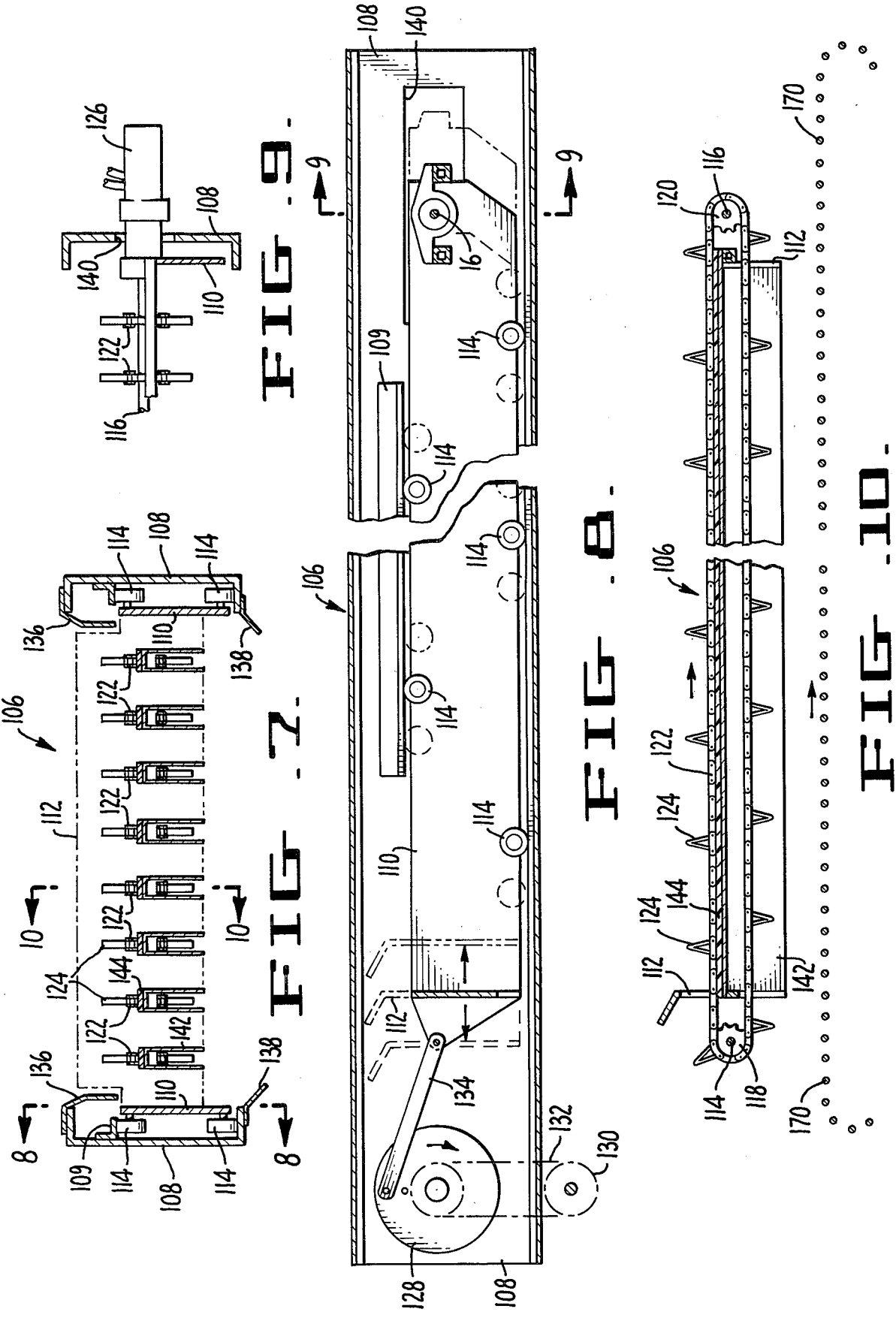

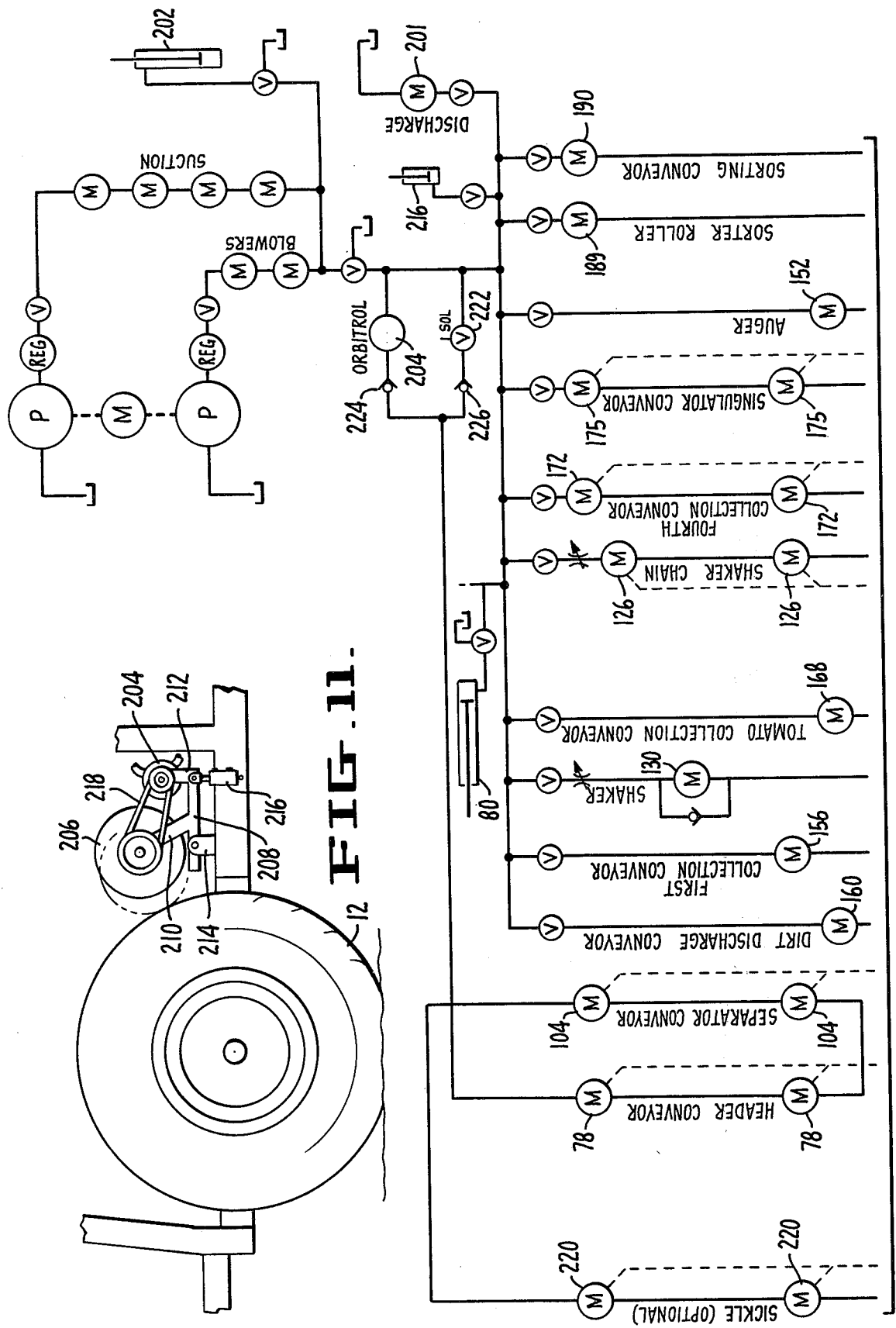

TOMATO HARVESTER

BACKGROUND OF THE INVENTION

The present invention relates to a mechanized tomato harvester and, more particularly, is concerned with such a harvester adapted to be draft propelled behind a tractor or like vehicle and to simultaneously harvest two or more crop rows. The invention is especially directed to such a harvester wherein preliminary separation of dirt from the harvested crop and final tomato sorting is effected automatically. In its more specific aspects, the invention is concerned with an improved shaker conveyor wherein the ratio of conveyor speed to shaker oscillation is continuously variable and shaker oscillation is rectilinear.

The invention represents an improvement in the mechanical tomato harvesters which have evolved since the early 1960's. These machines have been characterized in that they are self-propelled and adapted to mechanically harvest row crop tomatoes in one-row-at-a-time fashion. The early machines carried a crew of fourteen or so sorters who were stationed around sorting belts and visually inspected and sorted the tomatoes as they were harvested. More recent machines have been modified to employ electronic sorters, to some degree, and thus reduce the crew required for sorting. To date, however, the machines employing electronic sorters have essentially been modifications of the earlier machines wherein crewmen hand sorted the tomatoes. Thus, although modified machines have been effective in reducing the size of the sorting crew, they have not appreciably increased the speed of harvesting.

SUMMARY OF THE INVENTION

The machine of the present invention is designed to accommodate electronic sorting apparatus in such a way as to greatly increase the capacity of the machine and the speed of harvesting, as compared to conventional machines now in use. A principal feature contributing to this increased capacity and speed is the provision of dual header conveyors to enable the machine to simultaneously harvest two crop rows. Another significant and contributing feature is the arrangement of all of the main conveyors in a generally longitudinal orientation relative to the chassis of the harvester. The latter arrangement provides for essentially straight-line conveyance of the material being handled and greatly increases the efficiency of the harvesting operation, as compared to conventional harvesters now in use wherein the direction of product flow is altered as the product passes through the machine to accommodate visual inspection and hand sorting.

Still another feature which contributes to the increased capacity and speed of the harvester of the present invention is the provision of a new and improved shaker conveyor which enables the ratio of shaking oscillation and conveyor speed to be continuously varied, depending upon operating conditions. Another feature related to the latter feature is the provision of such a conveyor wherein shaking oscillations imparted to the conveyor are rectilinear.

BRIEF DESCRIPTION OF THE DRAWINGS

The aforementioned advantageous features of the invention and the beneficial objects resulting therefrom will become more apparent when viewed in light of the following detailed description and accompanying drawings wherein:

FIG. 3 is a top plan view of the inventive harvester, with parts thereof broken away for the sake of illustration, as it would appear when being drawn through a field by a draft vehicle;

FIG. 4 is a cross-sectional elevational view taken on the plane designated by Line 4—4 of FIG. 3 and illustrating the path which tomatoes and attached vines take when being processed by the harvester;

FIG. 5 is an elevational view taken on the plane designated by Line 5—5 of FIG. 3, illustrating the mechanism for selectively raising and lowering the header conveyors at the lead end of the harvester;

FIG. 6 is a cross-sectional elevational view taken on the plane designated by Line 6—6 of FIG. 3, illustrating the side conveyors for the handling of loose tomatoes and dirt clods;

FIG. 7 is a cross-sectional view of the shaker conveyor, taken on the plane designated by Line 7—7 of FIG. 4;

FIG. 8 is an elevational cross-sectional view of one side of the shaker conveyor, taken on the plane designated by Line 8—8 of FIG. 7;

FIG. 9 is a cross-sectional view taken on the plane designated by Line 9—9 of FIG. 8, illustrating the drive motor arrangement for the conveyor of the shaker conveyor;

FIG. 10 is a cross-sectional view taken on the plane designated by Line 10—10 of FIG. 7, illustrating one of the conveyor belts of the shaker conveyor and the collection conveyor belt disposed beneath the shaker conveyor;

FIG. 11 is an end view of one of the support wheels for the harvester, illustrating the metering pump used in association with that wheel to coordinate conveyor speed with the ground speed of the harvester; and, FIG. 12 is a schematic view, diagrammatically illustrating the hydraulic circuitry for the apparatus.

DESCRIPTION OF THE PREFERRED EMBODIMENT

Figure 1:
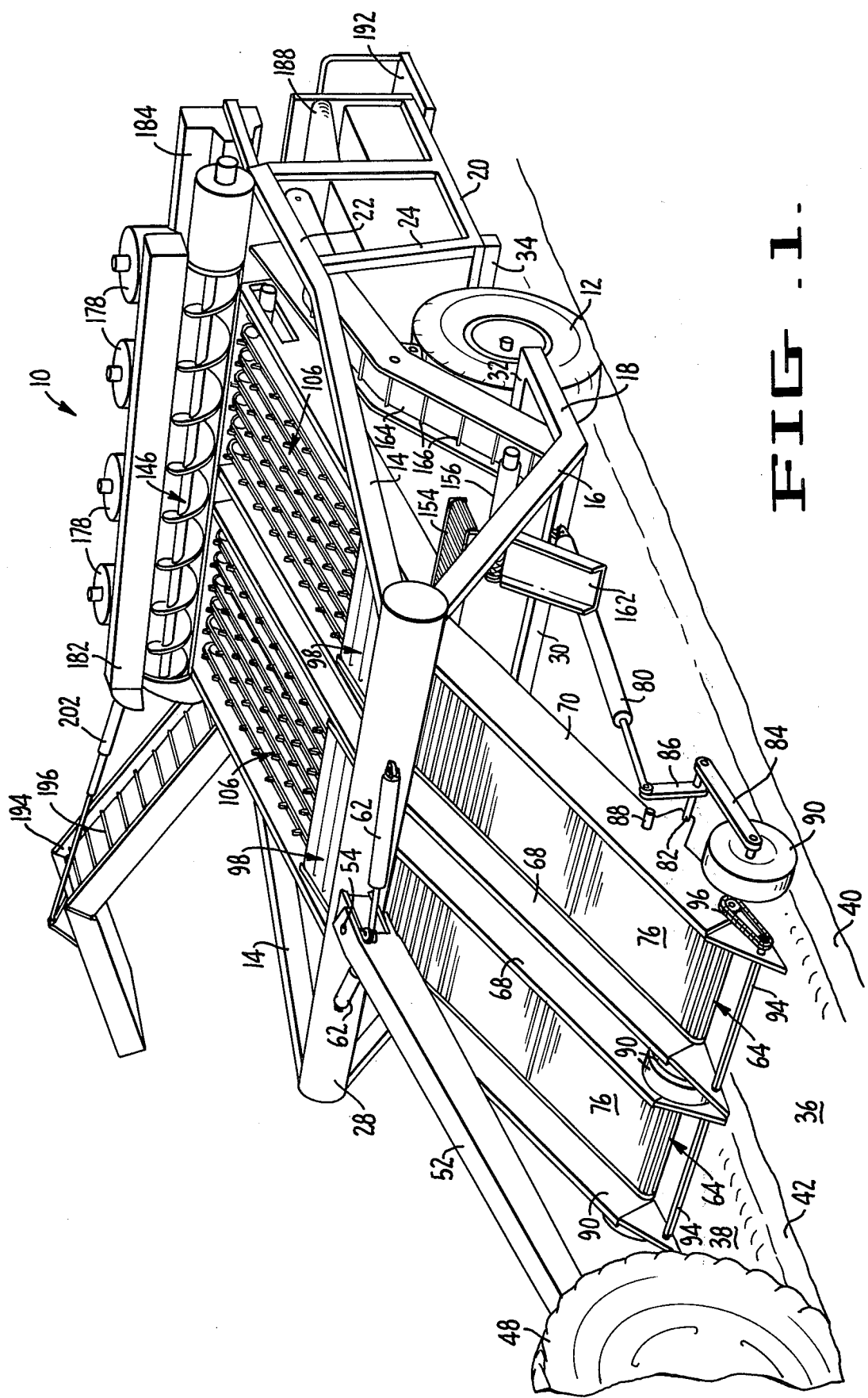
FIG. 1 is a perspective view of the inventive harvester, as it would appear when being towed by a draft vehicle.

Referring now to the drawings, the harvester is designated in its entirety by the numeral 10 and comprises, as its basic component a chassis or frame supported upon wheels 12. The principal components of the chassis may best be seen from FIG. 1 and comprise side members 14, 16, 18, 20, 22, 24 and 26; and transverse members 28, 30, 32 and 34. The side and transverse members are rigidly interconnected to form a distortion resistant framework. To the extent illustrated, the corresponding side members on opposite sides of the chassis are designated by like numerals.

As may best be seen from FIG. 3, the wheels 12 are spaced transversely of one another by a distance equal to the width of two crop rows, plus the space therebetween. The two crop rows illustrated in FIG. 3 are designated by the numerals 36 and 38 and the track spaces to either side of the rows are designated by the numerals 40, 42 and 44. From FIG. 3, it can be seen that the wheels 12 are so spaced transversely of one another that they may travel in the track spaces 40 and 44 and, thus, span the rows 36 and 38. Adjacent track rows (e.g., rows 42 and 44) are spaced from one another by a distance equal to the track of a conventional tractor and, thus, such a tractor may be employed in spanning relationship to one of the crop rows without crushing the crop. Such a tractor, designated 46, is partially illustrated in FIG. 3 in spanning relationship to the crop row 38, with its wheels 48 and 50 in the track spaces 42 and 44, respectively.

A rigid draft tongue 52 is pivotally connected to the transverse member 28 midway of the length of the member for movement about a generally vertical axis. The connection and axis are provided by a hinge pin 54. The forward end of the tongue 52 is adapted to be secured to a hitch on a tractor, such a hitch being depicted on the tractor shown in FIGS. 3 and 4 and designated by the numeral 56. As shown, the hitch 56 includes a pintle pin 58 received in the forward end of the tongue 52 to connect the tongue to the hitch.

Selectively expansible and retractable hydraulic cylinders 60 and 62 are connected to either side of the tongue 52 between the tongue and the transverse frame member 28. Through selective activation of these cylinders, as will become more apparent subsequently, the cylinders may be employed to swing the tongue 52 about the pin 54 and position the tongue so that a draft vehicle connected thereto will be in alignment with the track spaces to either side of one row of tomatoes being harvested while the wheels 12 of the harvester span that one row and the row adjacent thereto. Such a condition is illustrated in FIG. 3.

Figure 2:
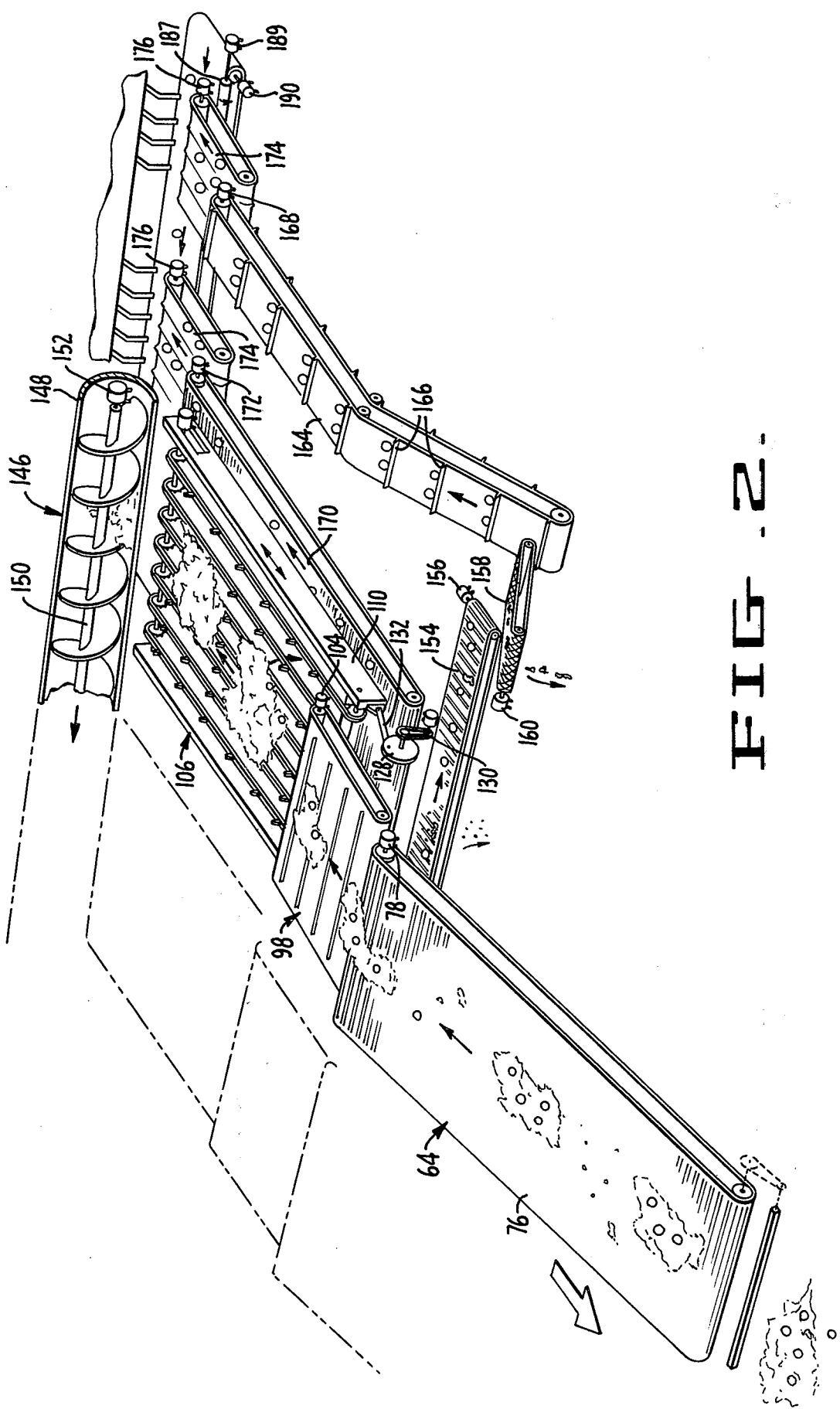
FIG. 2 is a perspective view diagrammatically illustrating the conveyor and associated sorting apparatus of the inventive harvester, with one side shown in solid line representation and the other side shown in partial phantom line representation.

Header conveyors 64 are pivotally secured to and extend forwardly and downwardly from the chassis to either side of its longitudinal center line. Pivotal connection is provided by brackets 66 affixed to and depending downwardly from the chassis and each conveyor comprises a pair of side members 68 and 70 having sprocket shafts 72 and 74 journaled to and extending transversely across the leading and trailing ends thereof. The sprocket shafts carry a closed-loop continuous belt 76 made up of interconnected bar links. Hydraulic motors 78 (See FIG. 2) drive the sprocket shafts 74 so as to move the upper reaches of the belts 76 in a rearward direction, as depicted by the arrow line in FIG. 4.

The pivotal connection provided by the brackets 66 is concentric with the axis of the sprocket shafts 74 and, as a result, the conveyors 64 may be swung about the pivotal connection without interfering with the operation of the conveyor belts. Selective raising and lowering of the header conveyors is provided through means of double-acting hydraulic cylinders 80 pivotally interconnected between the frame member 30 and a wheel support for each of the conveyors. The wheel support for each conveyor comprises a transversely extending rod 82 journaled to the side members 68 and 70, arms 84 fixed to the distal ends of the rod 82, and a lever 86 fixed to each rod intermediate the ends thereof. The rods of the cylinders 80 are pivotally connected to the distal ends of the levers 86. Stops 88 are provided on the side members 70 for abutment by the levers 86 upon extension of the cylinders 80. The distal ends of the arms 84 carry ground engaging wheels 90.

Selective extension of the cylinders 80 functions to raise the header conveyors 64, as depicted by the phantom line illustration in FIG. 5. Retraction of the cylinders functions to lower the header conveyors, as depicted by the solid line representation in FIG. 5. As the conveyors are lowered, the wheels 90 come into ground engagement and continued retraction of the cylinders from that point functions to raise the wheels and, thus, lower the leading ends of the header conveyors toward the ground. The arrow line on the solid line representation of the wheel 90 in FIG. 5 and the phantom line wheel shown directly thereabove depict the manner in which the wheels raise relative to the conveyors.

From the foregoing description, it should be apparent that the leading ends of the feeder conveyors can be selectively raised and lowered relative to the ground surface. Relatively minute adjustments are generally carried out during the course of harvesting. The conveyors are raised to the fully elevated condition, as depicted by the upper solid line representation in FIG. 5, when the harvester is being transported from one location to another.

The lead ends of the header conveyors 64 are spaced from one another by a distance substantially equal to the distance between adjacent crop rows. These lead ends are provided with diverging extensions 92 which have journaled thereto, and extending transversely therebetween, cutter bars 94. The bars 94 are provided for the purpose of breaking or cutting tomato vines at, or slightly below, ground surface. In operation, the sprockets are continually rotated about the longitudinal axes thereof by a chain drive connected to the drive for the conveyor belts 76. The chain drive comprises a closed-loop chain 96 trained over sprockets on the ends of the rods 94 and the sprocket shafts 72. As an alternative to the cutter bars, it is also anticpated that mechanical sickles could be employed to cut the vines being harvested at, or near, ground level. Such sickles could also be driven off of the sprocket shaft 72, or, alternatively, driven by a separate hydraulic motor.

Each header conveyor 64 has a separator conveyor 98 at its trailing end to receive vines discharged from the trailing ends of the header conveyors. The separator conveyors 98 are closed-loop belt conveyors having ribs 100 extending transversely thereacross at spaced intervals. The conveyors 98 are driven so that the upper reaches thereof continuously move toward the rear of the harvesting apparatus, as depicted by the arrow line in FIG. 4. A gap 102 is provided between the trailing end of each header conveyor 64 and the lead end of the separator conveyor 98 associated therewith so that loose tomatoes and dirt clods discharged from the header conveyors will fall through the gaps and not be transferred to the separator conveyors. The gap 102 may be adjusted by moving the position of the separator conveyor 98 and, ideally, the gap is of such a width that substantially all loose tomatoes and dirt clods may fall therethrough. In the preferred embodiment illustrated, the separator conveyors 98 slope downwardly toward the header conveyors 64. This sloping arrangement has the advantage that loose tomatoes and dirt clods which may be received on the separator conveyors 98 will tend to roll down and fall through the gap 102. Hydraulic motors 104 (See FIG. 2) drive the separator conveyors.

From the separator conveyors 98, vines and attached tomatoes are transferred onto shaker conveyors 106 disposed, respectively, in alignment with each of the shaker conveyors. The shaker conveyors 106 function to transfer the vines received thereon lengthwise of the harvester while, at the same time, subjecting the vines to oscillating movement to shake connected tomatoes loose.

The detailed construction of the shaker conveyors 106 may best be seen from FIGS. 7 to 10, inclusive. Each conveyor comprises: a pair of longitudinally extending transversely spaced side rails 108 fixedly mounted on the chassis of the harvester, said side rails being of generally channel-shaped configuration and having an intermediate rail 109 fixed thereto; a framework of generally rectangular configuration comprised of side members 110 rigidly interconnected by end members 112 to provide a boxlike structure open from top to bottom whereby articles may fall therethrough; rollers 114 carried by the side members 110 in rolling engagement with the rails 108 and 109 to support the framework for back and forth rectilinear movement on the rails; sprocket shafts 114 and 116 journaled to, and extending transversely of, the framework for movement therewith, said respective sprocket shafts carrying sprockets 118 and 120; closed-loop conveyor chains 122 extending longitudinally of the framework and around aligned sprockets on the respective shafts 114 and 116, said chains having outwardly extending fingers 124 thereon; an hydraulic motor 126 drivingly connected to the shaft 116 to drive the sprockets on the shaft and, in turn, continuously drive the chains received on the sprockets so that the upper reaches thereof move toward the forward end of the harvester, as depicted by the arrow line in FIG. 10; an eccentric crank 128 journaled to one of the side rails 108 for rotation about an axis extending normal to the side rails; an hydraulic motor 130 drivingly connected to the eccentric crank 128 by a drive chain 132 to rotate the crank about its axis; a link 134 pivotally connected between the crank 128 and one end of the framework whereby rotation of the crank functions to impart back-and-forth movement to the framework, as depicted by the arrow lines in FIG. 8; and, deflectors 136 and 138 extending downwardly from the upper and lower extremities of the side rails 108. The rails 108 are slotted at 140 to accommodate the drive motors 126 as the motors move back and forth with oscillating movement of the frameworks (See FIGS. 8 and 9).

From FIGS. 7 and 10, it can be seen that the upper reach of each of the chains 122 is supported over the length thereof. Such support is provided by inverted channel-shaped supports 142 extending over the length of the framework and secured to, and supported by, the end members 112 thereof. The outer upper surfaces of the supports 142 have plastic strips 144 mounted thereon for supporting engagement with the undersurfaces of the upper reaches of the chains 122. These strips have a low coefficient of frictional resistance and facilitate smooth movement of the chains. The lower reaches of the chains pass through the interior of the supports 142, as may best be seen from FIG. 7.

An auger 146 is mounted on, and extends transversely of, the chassis to the rear of the shaker conveyor 106. The purpose of the auger is to receive vine material as it discharges from the shaker conveyor and convey this material to the side of the machine where it is discharged to the ground. The auger comprises: a semi-cylindrical housing 148, said housing being open on the side thereof in apposition to the shaker conveyor; an auger screw 150 extending longitudinally through the housing for rotation therein; and, an hydraulic motor 152 coupled to one end of the auger screw to continuously drive it in a direction wherein the auger discharges to the left and side, as viewed in FIGS. 1 and 2.

Dirt clods and loose tomatoes which separate out by falling through the gap 102 between the trailing end of the header conveyor 64 and the lead end of the separator conveyor 98 fall onto a first collection conveyor 154. The conveyor 154 is of the closed-loop belt type and extends transversely across substantially the entire width of the harvester beneath both of the separator conveyors 98. An hydraulic motor 156 continuously drives the conveyor 154 so that its upper reach moves from left to right, as viewed in FIG. 2.

The output from the conveyor 154 is received on the upper reach of a dirt discharge conveyor 158, sometimes referred to herein as the second conveyor. The conveyor 158 is of the closed-loop belt type and mounted to slope downwardly from the conveyor 154. Belt 158 is continuously driven by an hydraulic motor 160 so that the upper reach of the belt moves upwardly (from right to left as viewed in FIG. 2). The downward inclination of the conveyor 158 is such that relatively smooth, round tomatoes discharged onto its upper reach roll downwardly under the influence of gravity and against the direction of travel of the belt. Irregular objects, such as dirt clumps, leaves or smashed or broken tomatoes, however, are conveyed on the upper reach of the belt and discharged over the upper end thereof, as depicted by the arrow line in FIG. 2. The dirt clods and the like so discharged over the upper end of the conveyor 158 spill into a chute 162 (See FIG. 1), from whence they fall to the ground.

Tomatoes which discharge from the lower end of the conveyor 158 under the influence of gravity are received on a tomato collection conveyor 164, sometimes hereafter referred to as the third conveyor. The conveyor 164 is of the closed-loop belt type and has extending transversely thereacross at spaced intervals barrier ribs 166. The ribs are for the purpose of preventing tomatoes received on the upper reach of the conveyor from rolling down and off the conveyor under the influence of gravity. As may be seen from FIG. 6, the conveyor 164 extends upwardly, first at a relatively steep incline adjacent the conveyor 158 and then at a more gentle incline. Conveyor 164 is continuously driven by an hydraulic motor 168 so that the upper reach thereof and any tomatoes received on that reach move toward the rear of the harvester.

Tomatoes which are shaken loose by the shaker conveyor 106 are received on a collection conveyor 170, sometimes hereafter referred to as the fourth conveyor. One such collection conveyor is provided for each of the shaker conveyors and the two collection conveyors thus provided are substantially identical in structure and mode of operation. Accordingly, in the following discussion, only one such conveyor will be described. The conveyor 170 is of the closed-loop type and is continuously driven by an hydraulic motor 172 so that the upper reach of the conveyor moves toward the rear of the harvester. As a result, tomatoes received on the conveyor are, ultimately, discharged over the rearmost end thereof.

Tomatoes discharged from the conveyors 164 and 170 are received on singulator conveyors 174. The singulator conveyors are of the conventional type employed to orientate tomatoes in single rows for electronic sorting. Each conveyor 174 is of the closed-loop belt type and is continuously driven by an hydraulic motor 176 so that the upper reach of the belt moves rearwardly of the harvester.

Suction fans 178 are mounted to the rear of the auger housing 148 so as to have the inlets 180 thereof disposed closely adjacent the discharge ends of the collection conveyors 164 and 170, and the outlet ends thereof discharging into a duct 182 extending over the top of the auger housing. The fans 178 are continuously driven so as to suck up loose debris which may be discharged from the collection conveyors 164 and 170 before that debris deposits on the singulator conveyors 174. Blowers 183 are provided beneath the discharge ends of the conveyors 164 and 170 to assist in directing debris to the inlets 180 of the suction fans 178.

Each singulator conveyor has an electronic color sorter 184 mounted to the rear thereof to scan tomatoes as they are discharged from the conveyor and eject off-color tomatoes and any dirt clods that may pass over the singulator belts. The sorters may be of any of the commercially available types, for example, the AMF Perceptor tomato harvester sorter sold by AMF Perceptor Systems of Alexandria, Va. In the arrangement illustrated, the sorters 184 employ kicker arms 186 to eject dirt clods and off-color tomatoes downwardly and forwardly, as shown by the dashed arrow line in FIG. 4.

A sorter roller 187 in the form of a cylindrical bar is disposed beneath and to the rear of the singulator conveyors 174 to assist in ejecting off-color fruit kicked away by the kicker arms 186. The roller 187 is driven in a counterclockwise direction, as viewed in FIG. 6, by an hydraulic motor 189 (See FIG. 2).

Tomatoes which are not ejected by the electronic color sorters drop from the singulator conveyors onto a final product sorting conveyor 188 extending transversely of the harvester. The conveyor 188 is of the closed-loop belt type and is so positioned and of such a length that it receives the output from all of the singulator conveyors. An hydraulic motor 190 continuously drives the conveyor 188 to move the upper reach thereof from right to left, as viewed in FIG. 2.

A worker platform 192 is mounted on the chassis to the rear of the conveyor 188 so that workers may stand on the platform and visually inspect and manually handle articles received on the conveyor 188. The purpose of the workers is to make one final visual inspection before the harvested tomatoes leave the harvester. Should the workers find defective or off-color tomatoes or debris on the conveyor 188, they will manually remove it and discard it to the ground.

The sorting conveyor 188 discharges to the lefthand side, as viewed in FIG. 1, onto a loading conveyor 194. Conveyor 194 is of the closed-loop belt type having barrier ribs 196 extending thereacross at regularly spaced intervals. An hydraulic motor 201 is provided to drive the loading conveyor 194.

The loading conveyor 194 is supported on a framework 198 journaled to the side of the harvester chassis for up and down movement relative thereto by hinge connections 200. A double-acting hydraulic cylinder 202 is connected between the harvester chassis and the framework 198 to selectively raise and lower the framework to accommodate discharge at different levels. Although not illustrated, it should be understood that the framework 198 may be articulated so that its distal end may be moved relative to its inner end. Hydraulic cylinders would be provided to selectively accommodate such articulation. In use, the conveyor 194 discharges to any suitable collection vehicle, such a tractor drawn wagon pulled alongside the harvester.

FIG. 11 illustrates one of the support wheels 12 for the harvester and a metering valve arrangement which cooperates therewith to coordinate header conveyor speed and separator conveyor speed with ground speed. The basic elements of this arrangement comprise an "ORBITRAL" valve which is driven by a wheel 206 selectively engagable with the outside peripheral surface of the wheel 12. The "ORBITRAL" valve is a commercially available Char-Lynn power steering valve by Eaton Fluid Power Products, Eaton Corporation, Fluid Power Division, of Eden Prairie, Minnesota. It operates to meter fluid in response to the speed at which the valve shaft is driven.

The mounting arrangement for the valve 204 and wheel 206 comprises a support 208 having a first arm 210 thereon supporting the wheel 206 for rotation about an axis parallel to the axis of the wheel 12 and the second arm 212 supporting the valve 204 with the drive shaft thereof in parallel relationship to the axis of the wheel 206. An upstanding member 214 mounts the support 208 on the chassis of the harvester for rotation about an axis parallel of that of the wheel 12. An hydraulic cylinder 216 is coupled between the chassis and the support 208 to swing the support to provide for selective movement of the wheel 206 into and out of engagement with the peripheral surface of the wheel 12, as illustrated by the phantom and solid line representations, respectively, in FIG. 11. Rotation of the wheel 206 is transmitted to the valve 204 by a V-belt 218 trained around sheaves coupled to the axle shaft for the wheel and the input shaft for the valve.

FIG. 12 is a schematic drawing diagrammatically illustrating the hydraulic circuit for the harvester. Conventional symbols are used in this figure and the various hydraulic motors and cylinders are designated by numerals corresponding to those used in the preceding description.

From FIG. 12, it will be seen that the "ORBITRAL" valve 204 controls the flow of hydraulic fluid to the header conveyor motors 78 and the separator conveyor motors 104 and that, additionally, optional sickle motors, designated 220, may be incorporated into the "ORBITRAL" controlled circuit. The motors 220 could be used when a sickle is used in place of the cutter bars 94.

The motor M and the pumps P illustrated in FIG. 12 would be carried on the harvester chassis and, in the preferred arrangement, a number of the control valves would be carried by the draft tractor for the harvester in order that the tractor operator could remotely operate much of the hydraulic circuitry of the apparatus. For example, the valve for the header conveyor lift cylinders 80 and the "ORBITRAL" lift cylinder 216 would ideally be carried by the tractor.

The circuits to the various hydraulic motors are provided with solenoid operated shutoff valves and these valves are also preferably remotely operable through means of a control console. Such a console might be located either on a harvester or on the draft tractor. Preferably, certain of the control valves are remotely operable from both the tractor and the harvester.

An electrically operated solenoid valve 222 is provided in a circuit parallel to that for the "ORBITRAL" valve 204. This solenoid valve is normally in a closed condition, but may be opened when the "ORBITRAL" valve is disengaged and it is desired to operate the header and separator conveyors and the optional sickle motors. Check valves 224 and 226 in the parallel lines leading from the "ORBITRAL" valve 204 and solenoid valve 222 prevent backflow through one of the valves when the other is open.

The cylinders 60 and 62 for the draft tongue are not seen in FIG. 12 because these cylinders would, preferably, be driven by and controlled from the hydraulic system of the draft tractor for the harvester.

It should be appreciated that the FIG. 12 circuit is a simplified diagrammatic representation. The actual circuit would vary from this representation. For example, additional motors and cylinders could be provided and adjustable flow control valves would be provided for each motor so that its speed could be selectively varied. As illustrated, such adjustable flow control valves are only shown for the shaker chain motor 126 and the shaker motor 130.

CONCLUSION

From the foregoing detailed description, it should be apparent that the invention provides the advantageous structural and operational features initially described herein. In particular, it provides a harvester wherein two crop rows can be simultaneously harvested and wherein the harvest product is treated and sorted with a minimum of manual labor. It should be understood, however, that the invention is not intended to be limited to the specifics of the illustrated embodiment, but, rather, is defined by the accompanying claims.

What is claimed is:

1. An improved shaker conveyor for a tomato harvesting apparatus, said conveyor comprising: a pair of side rails mounted on the apparatus and extending longitudinally thereof in transversely spaced relationship to one another; a generally rectangular frame disposed between said side rails; means mounting said frame on said rails for longitudinal guided rectilinear movement relative thereto, said frame being substantially open from top to bottom; first and second shafts journaled to and extending transversely of said frame adjacent, respectively, the forward and rearward ends thereof; said shafts carrying sprockets along the lengths thereof at spaced intervals; closed loop chains extending around aligned sprockets on the respective shafts so as to extend longitudinally of the frame, said chains having outwardly extending fingers; means to drive the chains to continuously move the upper reaches thereof toward the rear of the apparatus; and, means to oscillate the frame back and forth in a rectilinear path on the side rails independently of and simultaneously with movement of the chains by the drive means therefor.

2. An improved shaker conveyor, according to claim 1, wherein the means to drive the chains and means to oscillate the frame are independently adjustable whereby the ratio of chain speed to oscillation rate may be varied.

3. An improved shaker conveyor, according to claim 2, wherein the means to oscillate the frame comprises an hydraulically driven eccentric crank mounted against movement with the frame at one end thereof and a crank link coupled between the crank and the frame whereby rotation of the crank functions to oscillate the frame back and forth in a rectilinear path within the side rails.

* * * * *